United States Patent
Konet et al.

(10) Patent No.: US 8,494,765 B2
(45) Date of Patent: Jul. 23, 2013

(54) VEHICLE USER DISTANCE MEASURING SYSTEM

(75) Inventors: Heather Konet, Canton, MI (US); Jade Zuege, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 373 days.

(21) Appl. No.: 13/036,883

(22) Filed: Feb. 28, 2011

(65) Prior Publication Data

US 2012/0221189 A1   Aug. 30, 2012

(51) Int. Cl.
    *G01C 21/00* (2006.01)
(52) U.S. Cl.
    USPC .......................................... 701/433; 701/408
(58) Field of Classification Search
    USPC .................................. 701/408, 433
    See application file for complete search history.

(56) References Cited

U.S. PATENT DOCUMENTS

| | | | |
|---|---|---|---|
| 7,433,805 B2 * | 10/2008 | Vock et al. | 702/188 |
| 7,457,724 B2 * | 11/2008 | Vock et al. | 702/182 |
| 7,623,987 B2 * | 11/2009 | Vock et al. | 702/182 |
| 7,771,320 B2 | 8/2010 | Riley et al. | |
| 7,813,887 B2 | 10/2010 | Vock et al. | |
| 2007/0021269 A1 * | 1/2007 | Shum | 482/8 |
| 2008/0096726 A1 * | 4/2008 | Riley et al. | 482/8 |
| 2009/0006029 A1 * | 1/2009 | Vock et al. | 702/142 |
| 2009/0091477 A1 * | 4/2009 | Mc Call et al. | 340/990 |
| 2010/0036639 A1 * | 2/2010 | Vock et al. | 702/142 |
| 2010/0052931 A1 | 3/2010 | Kolpasky et al. | |
| 2010/0171642 A1 | 7/2010 | Hassan et al. | |
| 2010/0184563 A1 | 7/2010 | Molyneux et al. | |
| 2010/0184564 A1 | 7/2010 | Molyneux et al. | |
| 2010/0198498 A1 * | 8/2010 | Jansen | 701/201 |
| 2010/0279825 A1 | 11/2010 | Riley et al. | |
| 2010/0305779 A1 * | 12/2010 | Hassan et al. | 701/2 |
| 2012/0299754 A1 * | 11/2012 | Korn et al. | 340/990 |

* cited by examiner

Primary Examiner — Hussein A. Elchanti
(74) Attorney, Agent, or Firm — Global IP Counselors, LLP

(57) ABSTRACT

A distance measuring system comprises a vehicle and an electronic key. The vehicle includes a user interface system. The portable electronic key includes a distance data gathering component configured to determine a distance travelled by the electronic key and create distance data based on the distance travelled, and a communication component configured to communicate the distance data to the user interface system which is configured to output distance information based on the distance data.

21 Claims, 15 Drawing Sheets

VEHICLE USER DISTANCE MEASURING SYSTEM

BACKGROUND

1. Field of the Invention

The present invention generally relates to a vehicle user distance measuring system. More particularly, the present invention relates to a system that measures a distance travelled by an object, such as an electronic key for the vehicle, possessed by a vehicle user outside of the vehicle and indicates the distance travelled by the object, and thus by the user.

2. Background Information

Electric vehicles, such as fully electric or hybrid vehicles, are becoming more available and popular as an alternative to conventional combustion engine vehicles. Because an electric vehicle is powered at least in part by a rechargeable battery, the vehicle user may on occasion need to wait for a period of time while the battery is charging. Consumers who prefer an electronic or hybrid vehicle over a conventional vehicle tend to be environmentally sensitive and health conscious. Thus, such consumers may appreciate features of the vehicle that encourage outdoor and indoor fitness during the battery charging period or at other times when the user is not travelling in the vehicle.

SUMMARY

In view of the state of the known technology, one aspect of the present invention provides a distance measuring system comprising a vehicle and an electronic key. The electronic key includes a distance data gathering component configured to determine a distance travelled by the electronic key and create distance data based on the distance travelled, and a communication component configured to communicate the distance data to the user interface system which is configured to output distance information based on the distance data.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
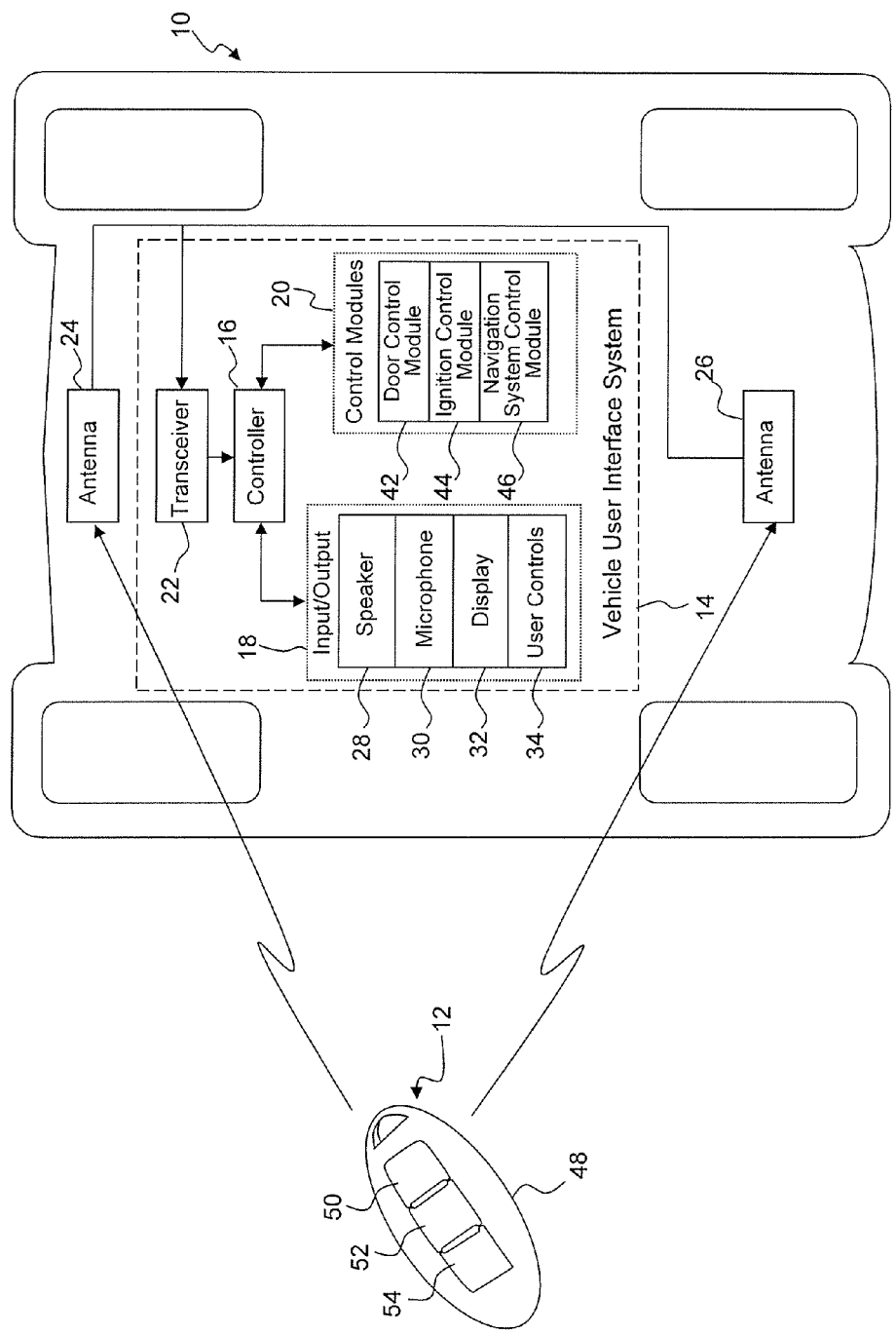
FIG. 1 is an exemplary block diagram of an electronic key for use with a vehicle user interface system employed in a vehicle according to a disclosed embodiment.

FIG. 1 illustrates an example of a vehicle 10 and a portable electronic key 12 that communicates with the vehicle 10. In one example, the electronic key 12 can be configured as an intelligent or smart key fob, or a smart card, as known in the art. The electronic key 12 can be a stand-alone portable device and is thus not limited to a key fob or other device to which keys or other objects are attached.

Figure 2:
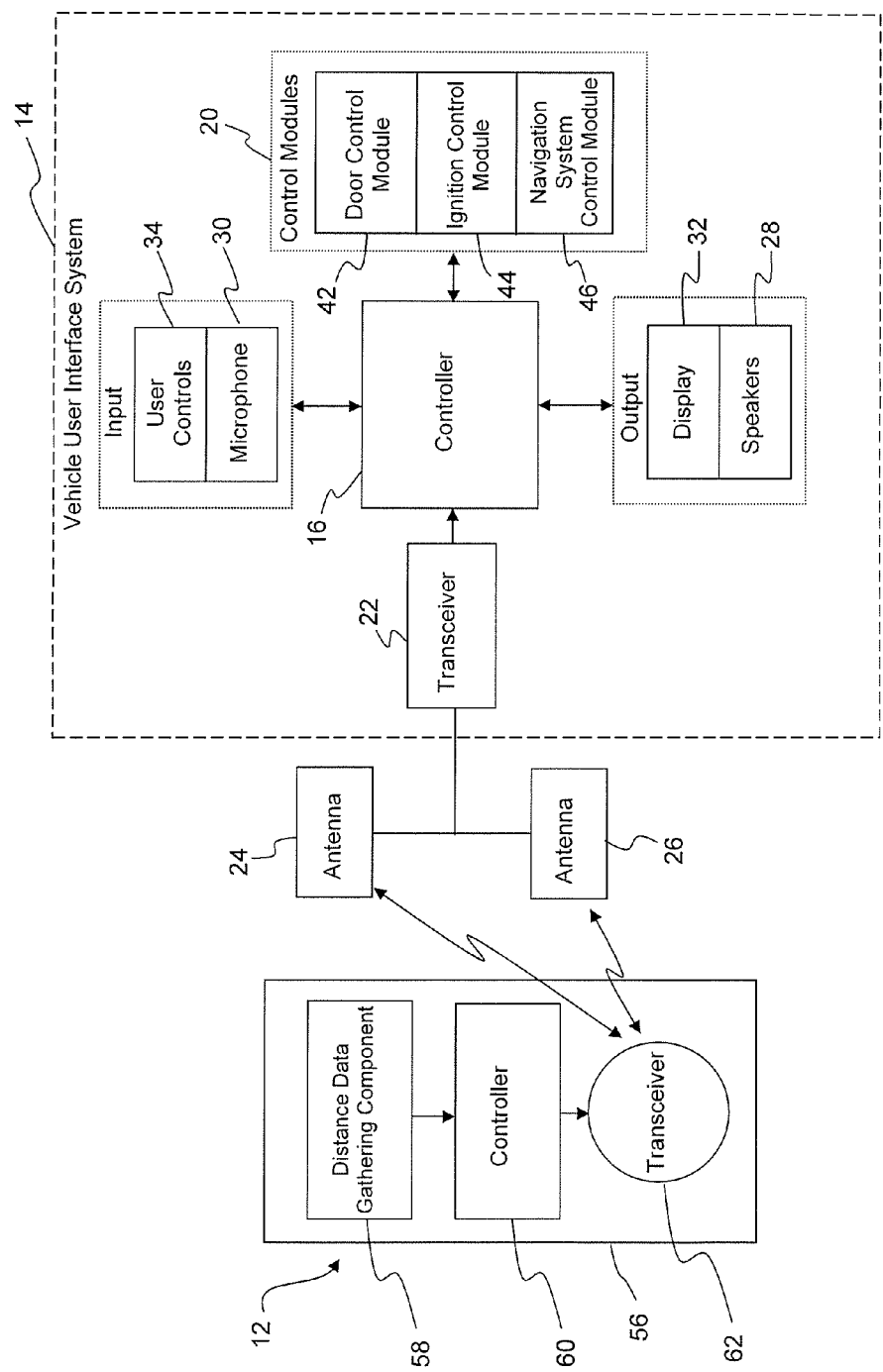
FIG. 2 is another exemplary block diagram further illustrating exemplary components of the electronic key as shown in FIG. 1.
Figure 3:
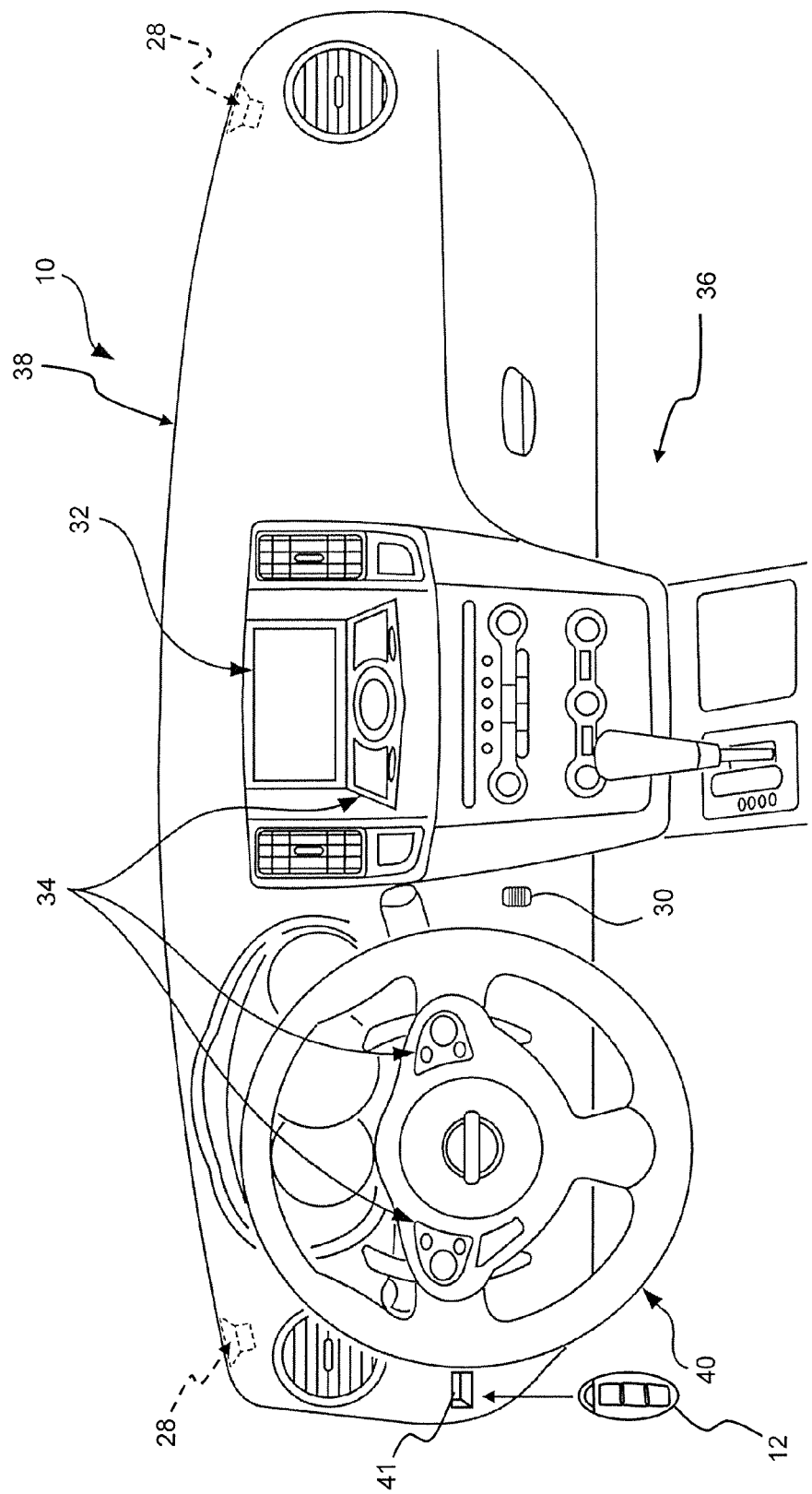
FIG. 3 is a perspective view illustrating an example of the instrument panel in the passenger compartment of the vehicle shown in FIG. 1.

Referring to FIGS. 1-3, the vehicle 10 includes a vehicle user interface system 14 that controls operation of certain components of the vehicle 10 and allows for communication between a vehicle user and certain components of the vehicle 10. For example, the vehicle user interface system 14 includes a controller 16, a plurality of input/output components 18, a plurality of control modules 20 and a transceiver 22. The transceiver 22, which can also be configured as a separate receiver and transmitter, is coupled to antennas 24 and 26 that can be positioned at any suitable location on the vehicle 10, such as at the front and rear of the vehicle 10. The transceiver 22 can thus receive communication signals from the electronic key 12 and other wireless devices, such as Bluetooth devices within the vehicle 10, or devices external of the vehicle 10 as discussed herein. Also, the transceiver 22 can transmit signals for receipt by other wireless devices, such as Bluetooth devices within the vehicle, or devices external of the vehicle 10 as discussed herein. The signals transmitted by the transceiver 22 and received by the transceiver 22 can be in the form of radio frequency (RF) signals or any other suitable signals in any suitable format such as code division multiple access (CDMA), time division multiple access (TDMA), quad-division multiple access (QDMA), frequency division multiple access (FDMA), peer-to-peer transmissions, and so on.

As understood by one skilled in the art, the controller 16 preferably includes a microcomputer with a control program that controls and interacts with the components of the vehicle user interface system 14 as discussed herein. The controller 16 can also include other conventional components such as an input interface circuit, an output interface circuit, and storage devices such as a ROM (Read Only Memory) device and a RAM (Random Access Memory) device. The RAM and ROM store processing results and control programs that are run by the controller 16. The controller 16 can be operatively coupled to the components of the vehicle user interface system 14 in a conventional manner. It will be apparent to those skilled in the art from this disclosure that the precise structure and algorithms for the controller 16 can be any combination of hardware and software that will carry out the functions of the embodiments discussed herein.

The input/output components 18 can include, for example, one or more speakers 28, one or more microphones 30, one or more displays 32 and a plurality of user controls 34. As shown in FIG. 3, these input/output components 18 can be located within the passenger compartment 36 of the vehicle 10. For example, speakers 28 can be disposed in an instrument panel 38 and at various locations within the passenger compartment 36 of the vehicle 10. Also, a microphone 30 can be disposed in the instrument panel 38 or at any other suitable location within the passenger compartment 36 of the vehicle 10, to receive voice input from a user. Accordingly, the speakers 28 emit sound, such as music from the entertainment system of the vehicle 10, voice from hands-free telephone use, or messages pertaining to vehicle conditions, navigation, distance information output by the distance measuring system described herein, and so on, to name a few. The microphone 30 can receive, for example, voice commands for the vehicle user interface system 14 and voice input for hands-free telephone use.

As further shown in FIG. 3, the instrument panel 38 typically includes at least one display 32 that can display information including navigation information such as maps, route information and the like, provided by a navigation component as known in the art. The display or displays 32 can also display vehicle condition information and messages, entertainment system information (e.g., radio channels), communication information such as telephone calling information, distance information output by the distance measuring system described herein, and so on. A plurality of user controls 34 can be disposed, for example, on the steering wheel 40 and at other locations on the instrument panel 38. For example, user controls 34 can be present below the display 32, and the display 32 can display user controls 34 in the form of buttons that can be operated by a user as understood in the art. For instance, the user can use the user controls 34 to control the entertainment system, navigation system and so on. Also, the user can use the user controls 34 to enter information such as the user's weight, height, age, sex, and so on for use by the distance measuring system as described herein.

In addition, a charging dock 41 can be included on the instrument panel 38. The charging dock 41 is typically located in the lower left side of the instrument panel 38. However, the charging dock 41 can be located at any suitable location in the passenger compartment 36. As understood in the art, the electronic key 12 is inserted to charge the electronic key battery, for example, by inductive charging. The electronic key 12 can include a battery power indicator, such as an e-ink display, LED, Multi-color LED, or any other suitable type of display, to indicate current battery charge. Also, a sensor (not shown), such as an electronic, mechanical or tactile sensor, can be located in the charging dock 41 to indicate to the controller 16 that the electronic key 12 is present in the vehicle 10.

As further shown, the control modules 20 of the vehicle user interface system 14 include a door control module 42, an ignition control module 44 and a navigation system control module 46. As understood in the art, the controller 16 controls the door control module 42 to perform locking or unlocking of the vehicle doors as appropriate. The controller 16 controls the ignition control module 44 to start and turn off the vehicle 10 as instructed. Also, the controller 16 controls the navigation system control module 46 to control, for example, the display 32 to display navigation information, such as a map, directions and so on as understood by one skilled in the art. The navigation system control module 46 can also control the audio system of the vehicle 10 to audibly present, for example, navigation information via speakers 28. The navigation system control module 46 can also receive user commands via the user controls 34, the microphone 30, or both, to control the navigation system of the vehicle 10 as understood in the art.

In addition, the door control module 42, ignition control module 44 and navigation system control module 46 can be controlled by the electronic key 12. For convenience, the electronic key 12 can be adapted to be wearable, or the components of the electronic key 12 can be included in a wearable device, such as a bracelet, necklace, wristband and so on. However, as discussed above, the electronic key 12 can be a stand-alone portable device that is uniquely linked to the vehicle 10 and not particularly configured to couple or connect to any other item.

As further illustrated in FIGS. 1-3, the electronic key 12 can include a housing 48 and a plurality of buttons or user controls that are configured to generate control data to control vehicle functions that the vehicle 10 is configured to perform. For example, the electronic key 12 can include a door locking button 50 that is operable to control the door control module 42 to lock the doors of the vehicle 10, a door unlocking button 52 that is operable to control the door control module 42 to unlock the doors of the vehicle 10, and an alarm button 54 that is operable to activate and deactivate an alarm of the vehicle 10. The electronic key 12 can also include other buttons, such as a trunk unlocking button (not shown), and so on.

The electronic key 12 further includes an internal circuit board 56 to which can be mounted components such as a distance data gathering component 58, a controller 60 and a transceiver 62, which can generally be referred to as a communication component. As understood in the art, the transceiver 62 can also be configured as a transmitter and the electronic key 12 can be configured with a separate receiver. The circuit board 56 typically includes pads (not shown) that sense the depression of door locking button 50, door unlocking button 52 and alarm button 54 by the user and send signals representing the button depression to the controller 60.

The controller 60 preferably includes a microcomputer with a control program that controls and interacts with the components of the electronic key 12 as discussed herein. The controller 60 can also include other conventional components such as an input interface circuit, an output interface circuit, and storage devices such as a ROM (Read Only Memory) device and a RAM (Random Access Memory) device. The RAM and ROM store processing results and control programs that are run by the controller 60. The controller 60 can be operatively coupled to the components of the electronic key 12 in a conventional manner. The ROM, for example, can also store electronic key identification data that uniquely identifies the electronic key 12. It will be apparent to those skilled in the art from this disclosure that the precise structure and algorithms for the controller 60 can be any combination of hardware and software that will carry out the functions of the embodiments discussed herein.

Upon receiving the signals generated by the depression of any of the control buttons on the electronic key 12 (e.g., door locking button 50, door unlocking button 52 or alarm button 54), the controller 60 processes those signals to generate control data to control vehicle functions that the vehicle 10 is configured to perform, and sends the control data to the transceiver 62. The transceiver 62 then transmits signals that include the appropriate control data and electronic key identification data. The signals can be RF signals or any other suitable types of signals in any suitable format. The signals can thus be received by the transceiver 22 of the vehicle user interface system 14 via antennas 24 and 26. Accordingly, the transceiver 22 provides the received signals to the controller 16, which processes the data in the received signals, determines whether the electronic key 12 is authorized to control the vehicle 10 based on the electronic key identification data, and controls the appropriate control module 20 to operate the appropriate component of the vehicle 10.

For example, if the door locking button 50 or door unlocking button 52 is pressed, the signals transmitted by the transceiver 62 will include data representing the door unlocking or door locking command. Hence, the controller 16 will process the data and control the door control module 38 to lock or unlock the vehicle doors as appropriate.

Also, the controller 60 in the electronic key 12 can control the transceiver 62 to periodically emit signals (e.g., every several milliseconds), and these signals can be received by the transceiver 22 when the electronic key 12 is within a prescribed range (e.g., a few feet) of the antennas 24 and 26, for example. These signals can include the electronic key identification data that the controller 16 can use to identify the electronic key 12 and to determine whether the electronic key 12 is authorized to control vehicle functions of the vehicle 10 as discussed herein. Also, the antennas 24 and 26 can be directional antennas that can determine at least a general direction from which the signals are being received as understood in the art. Accordingly, by performing, for example, a time-of-flight distance measuring technique as known in the art, the controller 16 can determine the respective times for the signals to travel between the electronic key 12 and the antennas 24 and 26, and thus determine the respective distances between the electronic key 12 and the antennas 24 and 26. The controller 16 can perform a ranging technique as known in the art to determine the location of the electronic key 12 based on the respective distances between the electronic key 12 and the antennas 24 and 26. As also can be appreciated by one skilled in the art, a combination of distance information obtained by ranging techniques and global positioning system (GPS) information can be used to determine the location of the electronic key 12 within a proximity of the vehicle 10. Naturally, the number of antennas 24 and 26 on the vehicle 10 can be increased to increase the accuracy at which the controller 16 can determine the location of the electronic key 12 as can be appreciated by one skilled in the art. For instance, three antennas can be present on the vehicle to enable the controller 16 to perform a triangulation technique as known in the art to determine the location of the electronic key 12.

In addition, the signals periodically emitted by the electronic key 12 can include ignition control signals that can be received by the transceiver 22 via the antennas 24 and 26 once the electronic key 12 is within a prescribed distance from the vehicle 10 as discussed above. That is, when a user has the electronic key 12 in their hand, pocket, purse, etc. and becomes close to the vehicle 10, the transceiver 22 can receive the signals emitted from the electronic key 12. The controller 16 can thus determine the location of the electronic key 12 with respect to the vehicle 10 as discussed above. Accordingly, when the controller 16 determines that the user possessing the electronic key 12 has entered the passenger compartment of the vehicle 10 or has at least gotten close to the vehicle 10, or when the controller 16 detects that the electronic key 12 is inserted into the charging dock 41 or that the user has pressed any of the control buttons on the electronic key 12, the controller 16 can receive the ignition control signals via the transceiver 22. The controller 16 can thus control the ignition control module 44 to disable an ignition lockout feature. Accordingly, the user can press a starter button that can be located, for example, on the instrument panel of the vehicle 10 or at any other suitable location, to signal the ignition control module 44 to start the vehicle.

As will now be discussed, the distance data gathering component 58 of the electronic key 12 is configured to gather distance data that can be used to determine a distance travelled by the electronic key 12. The distance data gathering component 58 provides the distance data to the controller 60, which controls the transceiver 62 to transmit the distance data for receipt by the transceiver 22 in the vehicle 10. The transceiver 22 provides this distance data to the controller 16, which performs operations based on the distance data as discussed in more detail below.

Figure 4:
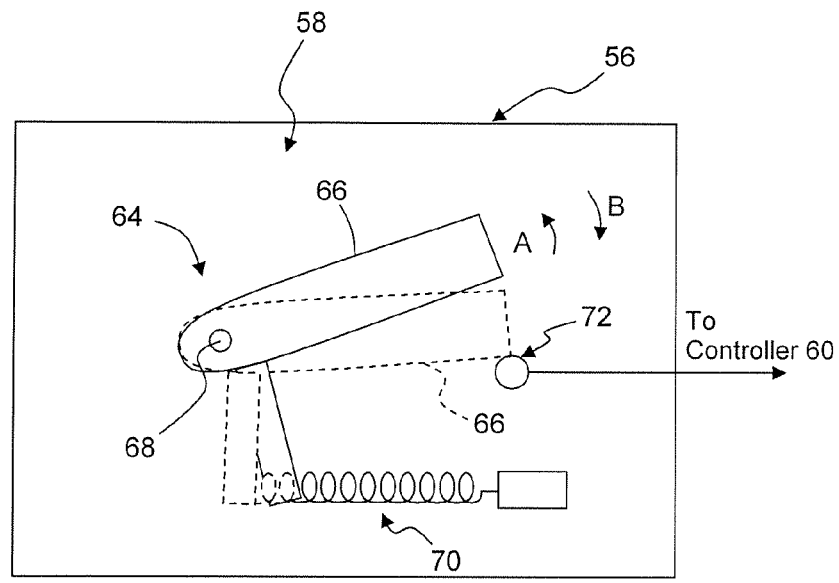
FIG. 4 is a block diagram illustrating exemplary components of one example of a pedometer assembly included in the electronic key.

The distance data gathering component 58 can generate the data, or can receive information from external sources to generate the data. For example, as shown in FIG. 4, the distance data gathering component 58 can include a type of pedometer 64 that counts the number of steps taken by the user possessing the electronic key 12. The pedometer 64 can include a mechanical spring lever arrangement. The mechanical spring lever arrangement includes a lever arm 66 that is pivotally attached to the internal circuit board 56 of the electronic key 12 at a pivot point 68. The lever arm 66 can be attached to either side of the internal circuit board 56. Typically, the lever arm 66 and associated components can be attached to the back of the internal circuit board 56 where more packaging space exists within the electronic key 12 to allow for the lever arm 66 to move without interference with the buttons on the electronic key 12. The lever arm 66 is biased in a direction A (e.g., upright) by a biasing member 70, such as a coiled spring.

When the user possessing the electronic key 12 takes a step, the force of inertia generated by the stepping movement causes the lever arm 46 to travel in a direction B (e.g., downward) to contact a contact pad 72, thus closing a circuit. The closing of the circuit sends a signal to the controller 60 that counts each circuit closing event as a user step. Thus, the pedometer 64 and the controller 60 can be generally referred to as a pedometer that counts the number of steps taken by the user. The controller 60 can store this information in a memory and continue to update the information while the user is moving to create distance data indicating the number of user steps.

Before the pedometer 64 is used, a calibration process can be performed. For example, as discussed above, a user can enter commands via the user controls 34, the microphone 30, or both to instruct the controller 16 to control the display 32 to display a user display 74. The user display 74 can include, for example, a historical data button 76, a competitive data button 78 and a personal profile button 80 that the user can select by commands entered via the user controls 34 and/or the microphone 30. The user display 74 also typically can include a greeting 82, an indication of steps taken for that date 84, an indication of the distance traveled corresponding to that number of steps 86, an estimated amount of calories burned 88, and a vehicle battery usage range saved 90 by walking instead of driving the vehicle 10. Naturally, if the user is using the pedometer 64 for the first time, the data entries 84 through 90 would be zero or blank.

Figure 6:
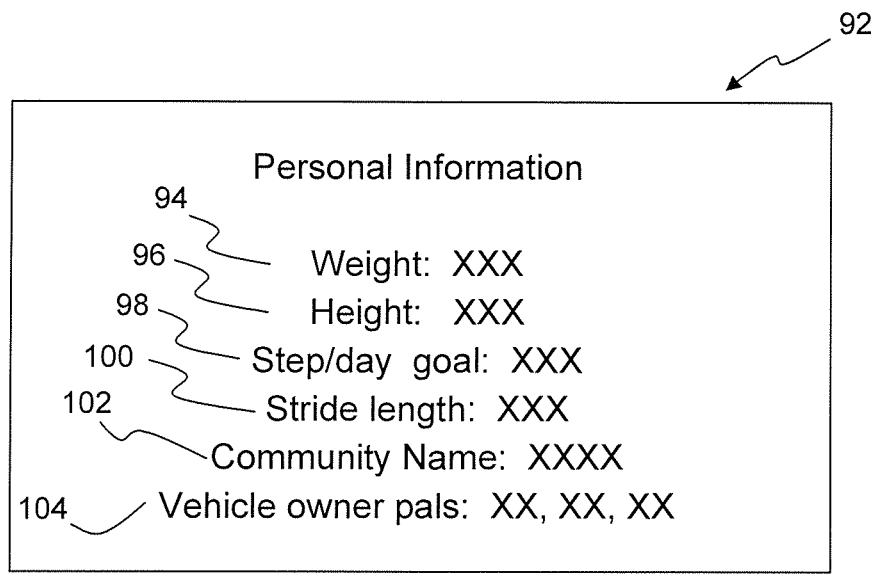
FIG. 6 is an example of another display screen displayed on the display of the vehicle user interface system.

When the user selects the personal profile button 80, the controller 16 controls the display 32 to display a personal profile display 92 as shown, for example, in FIG. 6. The user can thus use the user controls 34, the microphone 30, or both to enter user information such as the user's weight 94, height 96, steps per day goal 98, stride length 100, membership status in a vehicle-related exercise club 102 and vehicle owner exercise club pals 104.

The user's stride length information that is entered thus calibrates the pedometer 64 for use by that particular user. Hence, the entered stride length information can be used by the controller 16 to calculate the distance that the user travelled based on the number of steps that the pedometer 64 counts as discussed in more detail below. Alternatively, or in addition, the personal profile display 92 can instruct the user to walk for a predetermined distance, such as around the vehicle 10, so that the controller 16 can determine the user's stride length. That is, the pedometer 64 counts the number of steps taken by the user to walk around the vehicle 10, and the controller 60 controls the transceiver 62 to transmit the distance data representing the number of steps for receipt by the transceiver 22 and ultimately by the controller 16 as discussed above. Accordingly, the controller 16 can determine an average stride length of a user's step by, for example, dividing the known distance traveled (e.g., the perimeter of the car) and the number of steps taken to travel that known distance. The controller 16 can thus control the display 32 to display this calculated average stride length as the stride length 100 on the personal profile display 92.

Furthermore, this process can be repeated to calibrate the user's average stride length for running and jogging. For instance, the controller 16 can control the display 32 to display a message on the personal profile display 92 that instructs the user to jog around the vehicle, and the average stride length for jogging can be determined in a manner similar to the average stride length for walking as discussed above. The controller 16 can further control the display 32 to display a message on the personal profile display 92 that instructs the user to run around the vehicle, and the average stride length for running can be determined in a manner similar to the average stride length for walking as discussed above.

In addition, a different user (e.g., a spouse) can use a different electronic key 12 that is authorized for use with the vehicle 10. Since each electronic key 12 includes electronic key identification data as discussed above, the vehicle user interface system 14 can enable the different user to enter his or her information to be associated with that different electronic key 12. Accordingly, the vehicle user interface system 14 can determine, for example, the different user's stride length in any of the manners discussed above. The vehicle user interface system 14 can thus store the user information associated with the electronic key 12, and the user information associated with the different electronic key 12, and can perform the distance determining operations and so on for each respective user.

Figure 7:
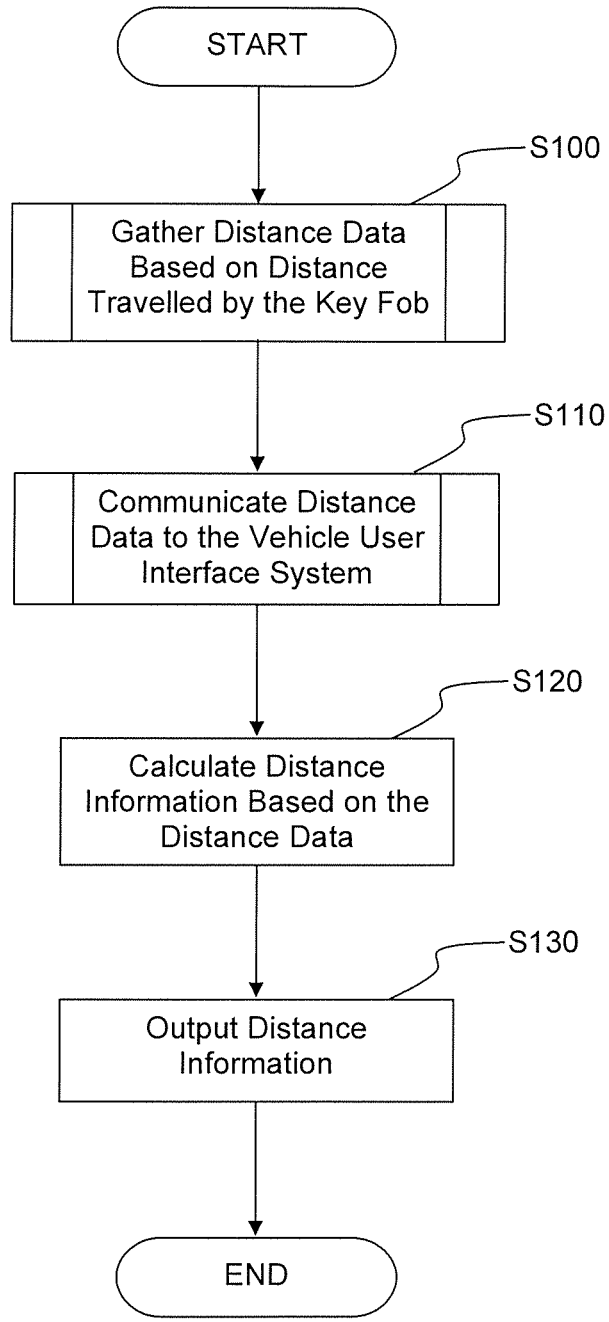
FIG. 7 is a flowchart illustrating exemplary operations performed with regard to the electronic key and vehicle user interface system.

FIG. 7 illustrates an example of operations performed for determining distance information using the electronic key 12 as discussed above. That is, in step S100, distance data is gathered based on the distance travelled by the electronic key 12.

Figure 8:
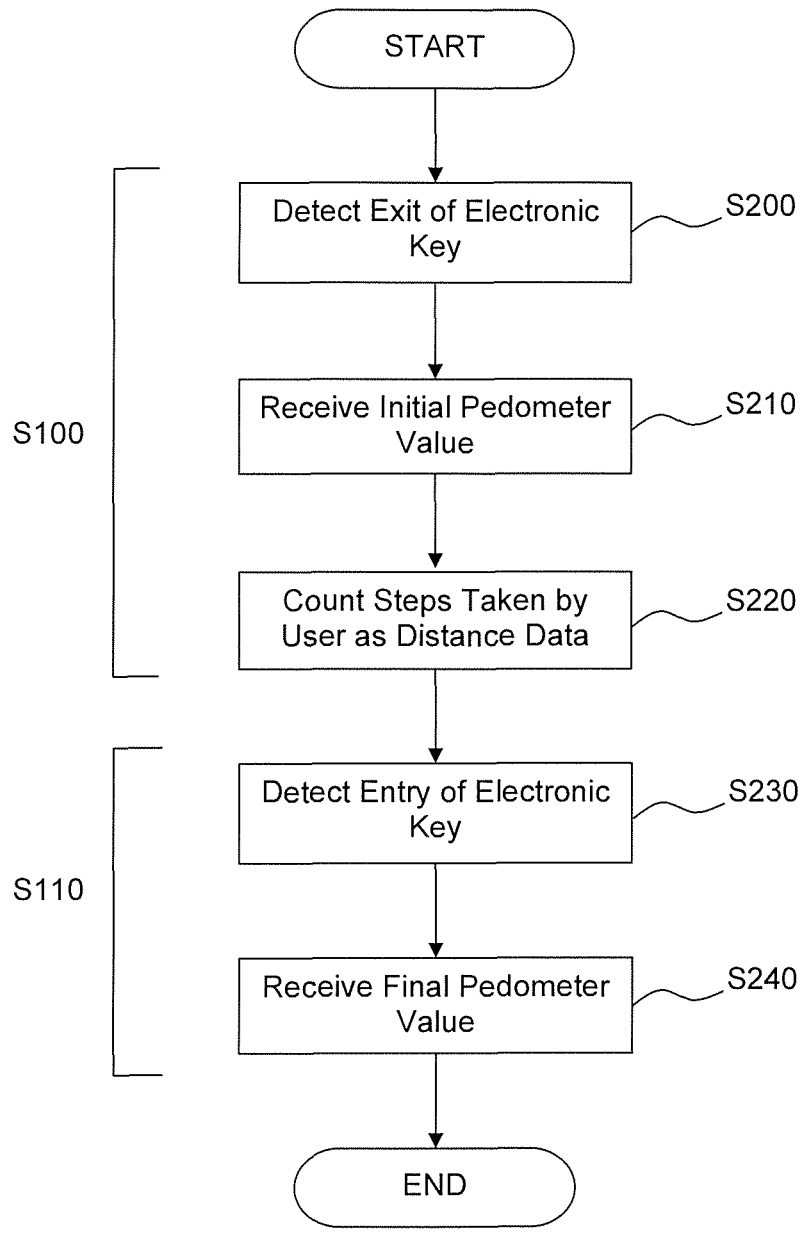
FIG. 8 is a flowchart illustrating exemplary detailed operations performed during the distance data gathering and communication operations of the flowchart shown in FIG. 7.

FIG. 8 illustrates an example of a subroutine of steps performed during step S100 for the type of distance data gathering component 58 involving a pedometer 64 as discussed above. Specifically, in step S200, the controller 16 determines whether the electronic key 12 exits the vehicle 10. The controller 16 can determine that the electronic key 12 has exited the vehicle 10 by performing the techniques discussed above to determine the location of the electronic key 12, and thus determine whether the electronic key 12 is still within the passenger compartment 36. The controller 16 can also determine that the electronic key 12 has exited or is about to exit the vehicle 10 when, for example, the sensor in the charging dock 41 indicates that the electronic key 12 has been removed from the charging dock 41. Another way the controller 16 can determine that the electronic key 12 has exited or is about to exit the vehicle 10 is by receiving control data from the transceiver 62 of the electronic key 12, for example, to control the door control module 42 to lock the doors of the vehicle 10. Still another way the controller 16 can determine that the electronic key 12 has exited or is about to exit the vehicle 10 is by the vehicle being shut off. Still another way the controller 16 can determine that the electronic key 12 has exited or is about to exit the vehicle 10 is by receiving control data to initiate the distance measuring process by operating, for example, a button or sequence of buttons on either the electronic key 12 or the user controls 34 on the instrument panel 38.

It should also be noted that the controller 60 can control the transceiver 62 to periodically transmit a signal including the step count value that is stored in a memory (e.g., RAM) in the electronic key 12. Thus, when the electronic key 12 is in the passenger compartment 36 of the vehicle 10 or close to the vehicle as discussed above, the transceiver 22 can detect the signal including the step count value. The step count value represents the number of steps that have been counted by the pedometer 64. If the memory is resettable, the electronic key 12 can include a button, for example, that enables a user to reset the step count value to zero at any time. Also, the controller 60 of the electronic key 12 can be programmed to automatically reset the step count value when the electronic key 12 exits or is about to exit the vehicle 10 as determined in any of the ways discussed above. For instance, the controller 60 can receive a signal from the transceiver 22 indicating that the controller 16 has determined that the electronic key 12 has exited or is about to exit the vehicle 10. The controller 60 can receive this signal via, for example, the transceiver 62 or a separate receiver as discussed above and as understood in the art. However, if the memory is not resettable, the step count value will be a running total of steps counted by the pedometer 64.

Accordingly, the transceiver 22, for example, can receive the signal including the step count value via, for example, antennas 24 or 26, or by an antenna or sensor in or proximate to the charging dock 41. The transceiver 22 thus provides the step count value to the controller 16. When it is determined in step S200 that the electronic key 12 exits the vehicle 10, the controller 16 stores the step count value as the initial step count value in step S210.

When the user possessing the electronic key 12 begins walking (or jogging or running) outside the vehicle 10, the pedometer 64 counts the steps taken by the user and the controller 60 creates the distance data in step S220 as the step count value in a manner as discussed above. That is, the distance data can represent the number of steps that are detected by the pedometer 64.

In step S110 shown in FIG. 7, the distance data is communicated to the vehicle user interface system 14. That is, as shown in the subroutine steps in FIG. 8, the controller 16 can determine in step S230 that the user possessing the electronic key 12 has returned to the vehicle 10 in any of the ways discussed above. For example, the controller 16 can determine that the electronic key 12 has entered or is about to enter the vehicle 10 by performing the techniques discussed above to determine the location of the electronic key 12, and thus determine whether the electronic key 12 is within or close to the passenger compartment 36. The controller 16 can also determine that the electronic key 12 has entered the vehicle 10 when, for example, the sensor in the charging dock 41 indicates that the electronic key 12 has been inserted into the charging dock 41. Another way the controller 16 can determine that the electronic key 12 has entered or is about to enter the vehicle 10 is by receiving control data from the transceiver 62 of the electronic key 12, for example, to control the door control module 42 to unlock the doors of the vehicle 10. Still another way the controller 16 can determine that the electronic key 12 has entered or is about to enter the vehicle 10 is by starting the vehicle. Still another way the controller 16 can determine that the electronic key 12 has entered or is about to enter the vehicle 10 is by receiving control data to finalize the distance measuring process by operating, for example, a button or sequence of buttons on either the electronic key 12 or the user controls 34 on the instrument panel 38.

When the controller 16 thus determines in step S230 that the electronic key 12 has entered the vehicle 10 in a manner as discussed above, the transceiver 22, for example, can receive from the transceiver 62 a signal including the count value via, for example, antennas 24 or 26, or by an antenna or sensor in or proximate to the charging dock 41 as discussed above. The transceiver 22 thus provides the step count value to the controller 16. Hence, the controller 16 stores the step count value as the final step count value in step S240.

Accordingly, in step S120 shown in FIG. 7, the controller 16, for example, calculates distance information based on the distance data. For instance, the controller 16 can subtract the initial step count value from the final step count value to determine the number of steps taken by the user for that period during which the user was out of the vehicle 10. The controller 16 can then use formulas (e.g., 2000 steps/mile as determined based on the user's stride length, 100 calories/mile walking based on the user's height and weight, etc., and 100 miles of vehicle travel per vehicle battery charge) to determine the equivalent distance travelled, calories burned and battery range saved. For example, if the difference between the final count value and initial count value indicates a total of 924 steps, the calculation of 924 steps*0.0005 miles/step equals 0.462 miles travelled. Also, the calculation of 0.462 miles*100 calories/mile equals 46 calories burned, and the calculation of 0.462 miles*(1 charge/100 miles) equals 0.46% battery range saved. For example, if the user walked to the store and back while the battery was being charged, this indication informs the user that the user saved 0.46% of the battery life by walking instead of waiting for the battery to charge and then taking the vehicle 10 to the store. The controller 16, for example, can calculate the user's average speed based on the distance travelled divided by the time that the distance data gathering component 58 was gathering distance data (e.g., the time that the user was moving).

Figure 5:
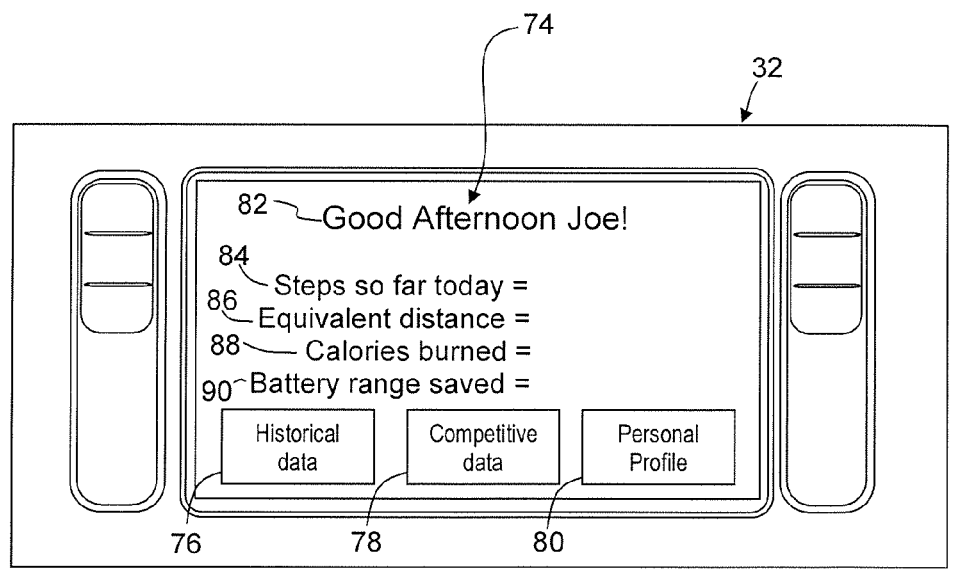
FIG. 5 is an example of a display screen displayed on the display of the vehicle user interface system.
Figure 9:
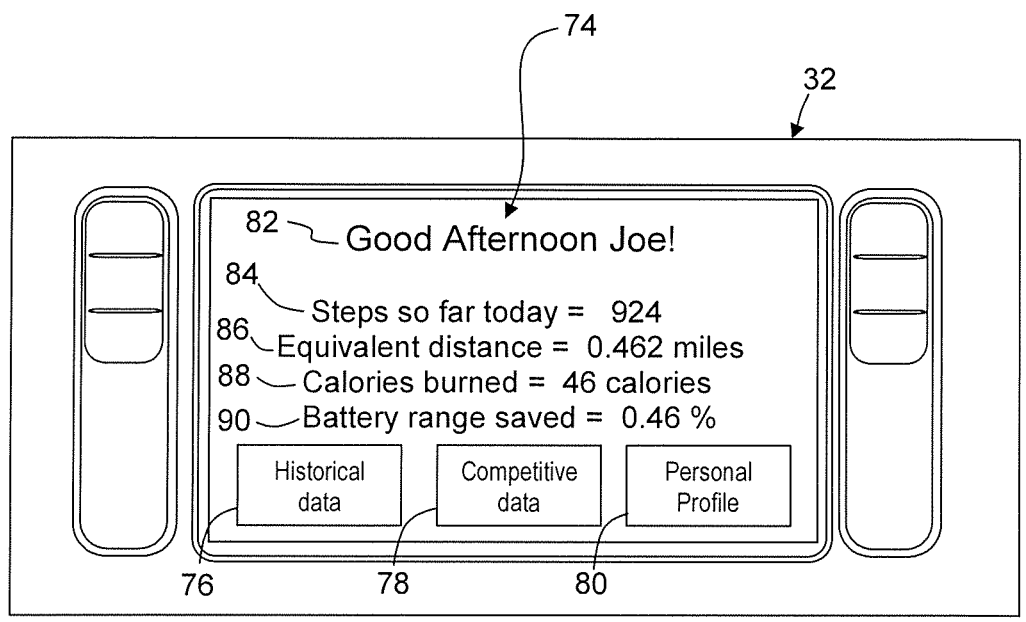
FIG. 9 is an example of distance information that can be displayed on the display screen of the vehicle user interface system.

In step S130, the controller 16 can control the display 32 to display the distance information in the user display 74 as shown, for example, in FIG. 9 which is similar to FIG. 5 but has values displayed for data entries 84 through 90. The controller 16 can also control the audio system of the vehicle 10 to audibly present information pertaining to the distance travelled via, for example, speakers 28.

Furthermore, the controller 16 can continue to store the distance data for each period in which the user possessing the electronic key 12 travels outside of the vehicle 10, and can continue to store a sum of the distance data for all the periods, as desired. In addition, the user can select the historical data button 76 or the competitive data button 78 via the user controls 34 and/or microphone 30 as discussed above to control the display 32 to display the displays shown, for example, in FIGS. 10-14.

Figure 10:
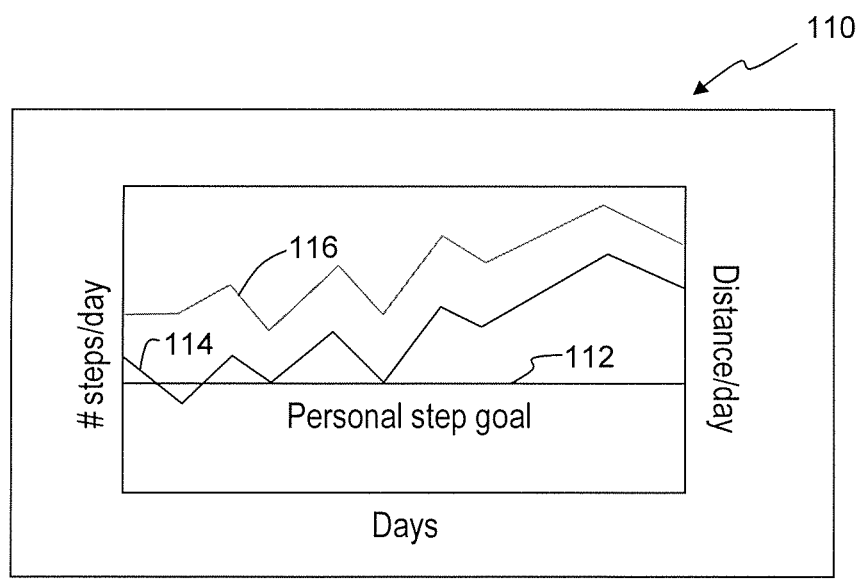
FIGS. 10-12 are further examples of distance information that can be displayed on the display screen of the vehicle user interface system.
Figure 11:
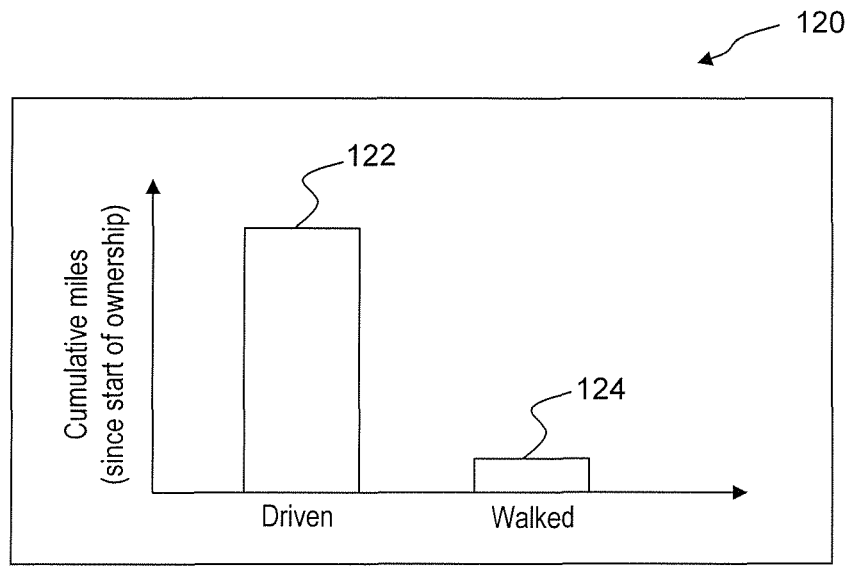
Figure 12:
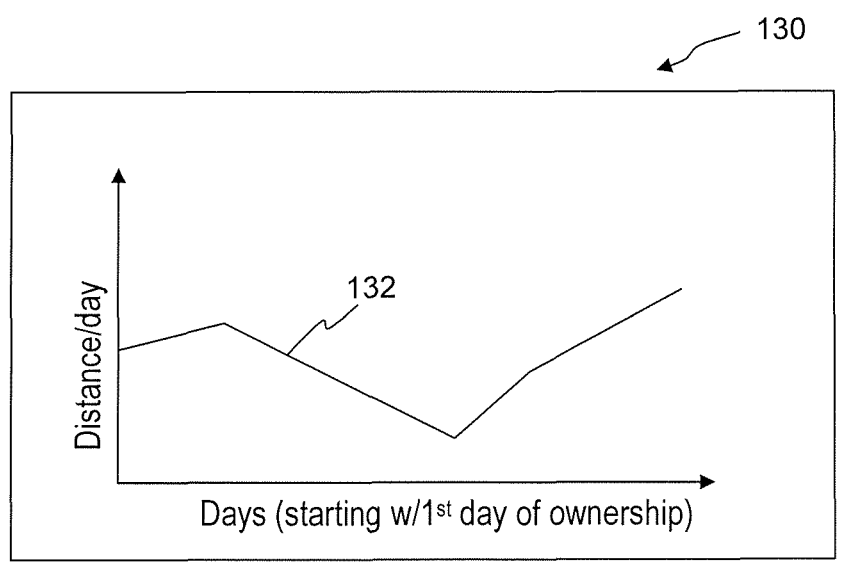

For instance, the user can select the historical data button 76 to display a personal step goal graph display 110 as shown in FIG. 10. The graph display 110 indicates a personal step goal 112 compared to a graph of the number of steps determined per day 114 and the distance travelled per day 116 over a period of days (e.g., one week or any suitable number of days). In response to selection of the historical data button 76, the display 32 can display a bar graph 120, as shown in FIG. 11, indicating a comparison of the number of miles driven 122 and the number of miles stepped 124 since, for example, the user purchased or started using the vehicle 10. Further in response to selection of the historical data button 76, the controller can also cause the display 32 to display a graph 130, as shown in FIG. 12, indicating a distance 132 stepped per day since, for example, the user purchased or started using the vehicle 10.

Figure 13:
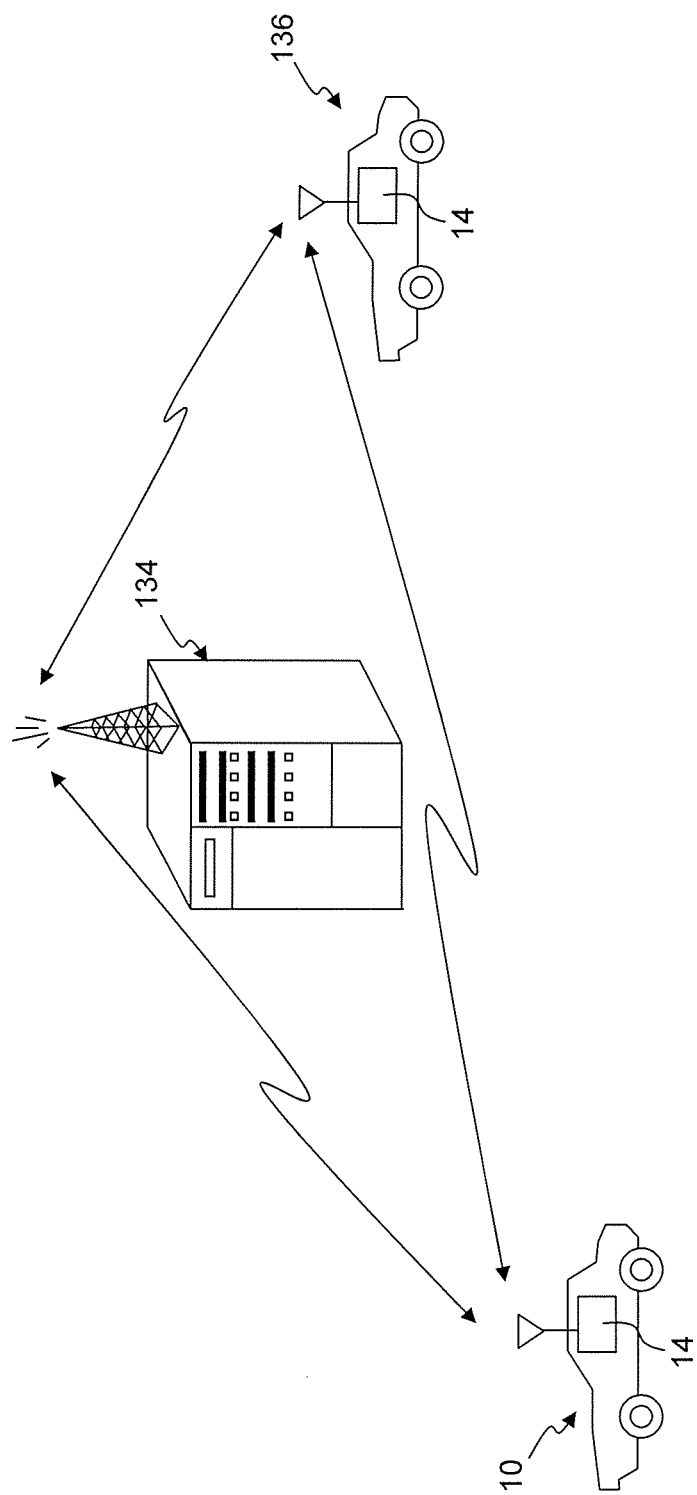
FIG. 13 is an exemplary block diagram illustrating an example of communication between the vehicle user interface system, at least one external location such as a server and at least one other vehicle.

In addition, as shown in FIG. 13, the vehicle user interface system 14 of vehicle 10 is configured to communicate with, for example, a server 134 that is external of the vehicle 10. Hence, the vehicle user interface system 14 can communicate the distance data, or data representing the estimated distance travelled by the user, to the server 134 that is external of the vehicle 10. The server 10 can then use this information to calculate user statistics, for example, pertaining to users of electronic or hybrid vehicles. In addition, the vehicle user interface system 14 is configured to communicate with the vehicle user interface system 14 of other vehicles 136. This communication can occur via server 134, for example, directly in a peer-to-peer type manner, or in any other suitable manner as known in the art. Hence, the vehicle user interface system 14 can transmit the distance information and related information to the vehicle user interface systems 14 of other vehicles 136, and receive other distance information and related information from the vehicle user interface system 14 of other vehicles 136. The vehicle user interface system 14 can thus compare the distance information to the other vehicle distance information. The vehicle user interface system 14 can therefore determine statistics that, for example, compare the behavior of the user of the vehicle 10 to other users. Additionally, the server 134 can make the distance information available to be accessed by a user interface external to the vehicle 10, such as a home computer.

The vehicle user interface system 14 can also be configured to reset the data after a prescribed period of time (e.g., one year) or as instructed by the user via, for example, user controls 34. For instance, after the vehicle user interface system 14 uploads the data to, for example, a server 134 or another external device (e.g., a memory stick, PC and so on) for archiving, the data in the memory of the vehicle user interface system 14 can be reset if desired.

Figure 14:
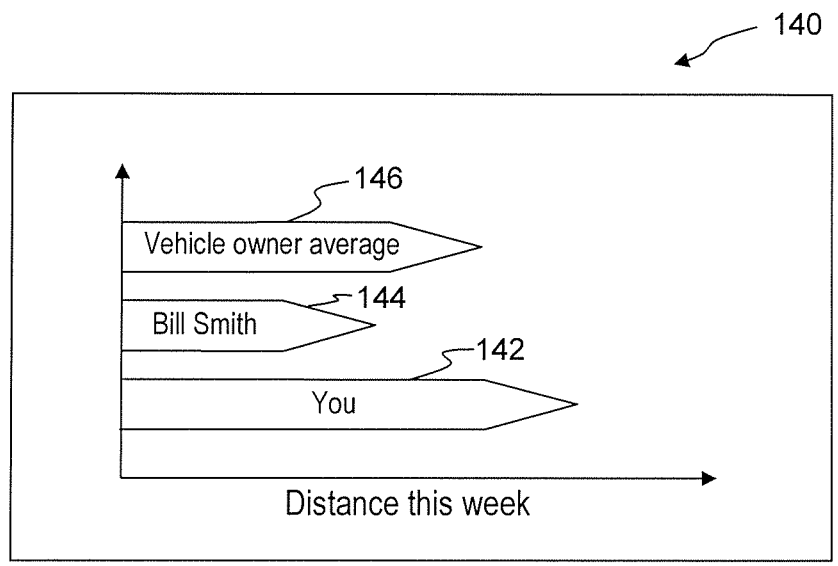
FIGS. 14 and 15 are still further examples of distance information that can be displayed on the display screen of the vehicle user interface system.
Figure 15:
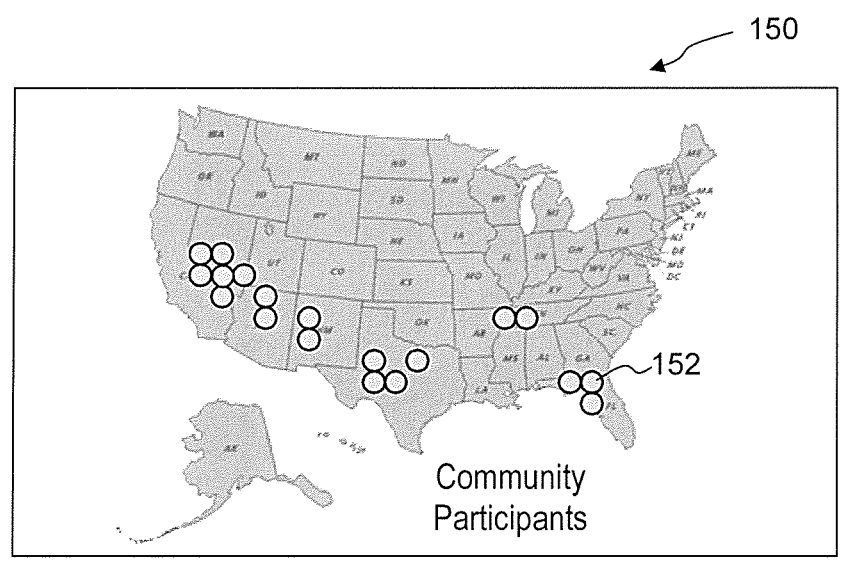

Accordingly, since the vehicle user interface system 14 can receive information from other users, the user can select the competitive data button 78 to display a bar graph display 140, as shown in FIG. 14. The display 140 illustrates a comparison of the distance 142 that the owner stepped during a week period to a distance 144 that another owner (e.g., an owner pal) stepped that week and an average distance 146 that all members in the community stepped that week. Also, in response to selection of the competitive data button 78, the controller 16 can cause the display 32 to display a map display 150, as shown in FIG. 15, that identifies the locations 152 of particular members in the community. For instance, the map display 150 can be configured by the user to display the locations 152 of specific members and/or concentrations of members of the community. Alternatively, the map display 150 can be configured by the user, for example, to show all members of the community or just friends of the user. The map display can also display the friends of the user in a manner to distinguish them from other members in the community. For example, the map display 150 can display the friends of the user in a particular color, and display the other members in a different color. The map display 150 can also display additional information pertaining to the friends, such as a link to their names, addresses, distance information, and so on. Naturally, the map display 150 can be configured to display any suitable information and arrangement of information.

As understood in the art, the lever arm arrangement for the pedometer 64 shown in FIG. 4 is typically low in cost and does not drain power from the battery of the electronic key 12 when moving in directions A and B. However, the movement of the lever arm 66 can on occasion create a slight clicking noise that may be perceived by the user.

Figure 16:
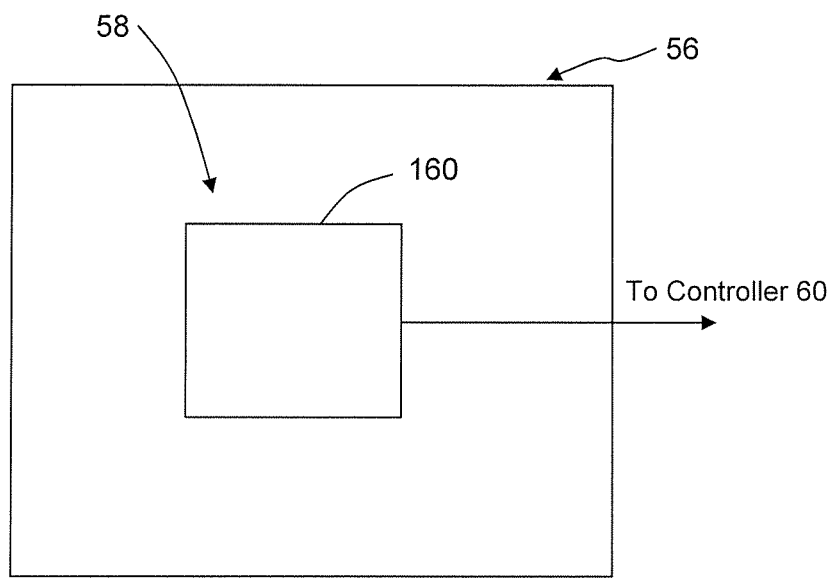
FIG. 16 is a block diagram illustrating exemplary components of another example of a pedometer assembly included in the electronic key.

Accordingly, instead of using a lever arm arrangement, the distance data gathering component 58 of the electronic key 12 can include a piezoelectric accelerometer 160 as shown in FIG. 16. The piezoelectric accelerometer 160 can be in the form of a microchip and attached to the internal circuit board 56 of the electronic key 12. The piezoelectric accelerometer 160 can be attached to the back of the internal circuit board 56 where more packaging space exists within the electronic key 12 to avoid interference with the buttons on the electronic key 12. As understood in the art, the piezoelectric accelerometer 160 includes strain gauges that deform due to the inertia from the user stepping.

As further understood in the art, the piezoelectric accelerometer 160 can include one, two or three strain gauges that correspond to one-axis, two-axis or three-axis sensing capability. In a two-axis system, an additional strain gauge is included on the same plane as the first strain gauge but oriented in a different direction than the first strain gauge. In a three-axis system, a third strain gauge is added on a different plane than the plane on which the first and second strain gauges are disposed. As can further be appreciated by one skilled in the art, the three-axis system generally can provide a greater level of accuracy than the one-axis and two-axis systems.

During operation, the deformation experienced at the strain gauge or gauges is measured as time versus acceleration by a processor in the piezoelectric accelerometer 160 which continuously samples data from the strain gauge or gauges at desired intervals (e.g., every several microseconds) and uses the sampled data to determine if a step occurred. An advantage of a piezoelectric accelerometer system over a mechanical spring lever system is that a piezoelectric accelerometer system can generally provide greater step counting accuracy. However, unlike the lever movement which does not draw power from the electronic key battery, the sampling does draw some power from the electronic key battery. Additionally, the greater step accuracy can also allow for greater error correction by correctly determining when a step is actually taken, and not counting unintended movement of the electronic key 12 when, for example, the electronic key 12 is dropped.

In the manner as shown in the flowcharts of FIGS. 7 and 8, the piezoelectric accelerometer 160 gathers and sends the step information to the controller 60 which generates distance data. As with the lever arm arrangement shown in FIG. 4, the controller 60 then sends this information to the transceiver 62. The transceiver 62 can then transmit the distance data for receipt by the transceiver 22 of the vehicle user interface system 14. The controller 16 can then calculate the distance information in the manner discussed above with regard to FIGS. 7 and 8, and vehicle user interface system 14 can then present the distance information via the display 32 and/or the speakers 28 as discussed above with regard to the flowchart in FIGS. 7 and 8 and as shown in FIG. 9.

Figure 17:
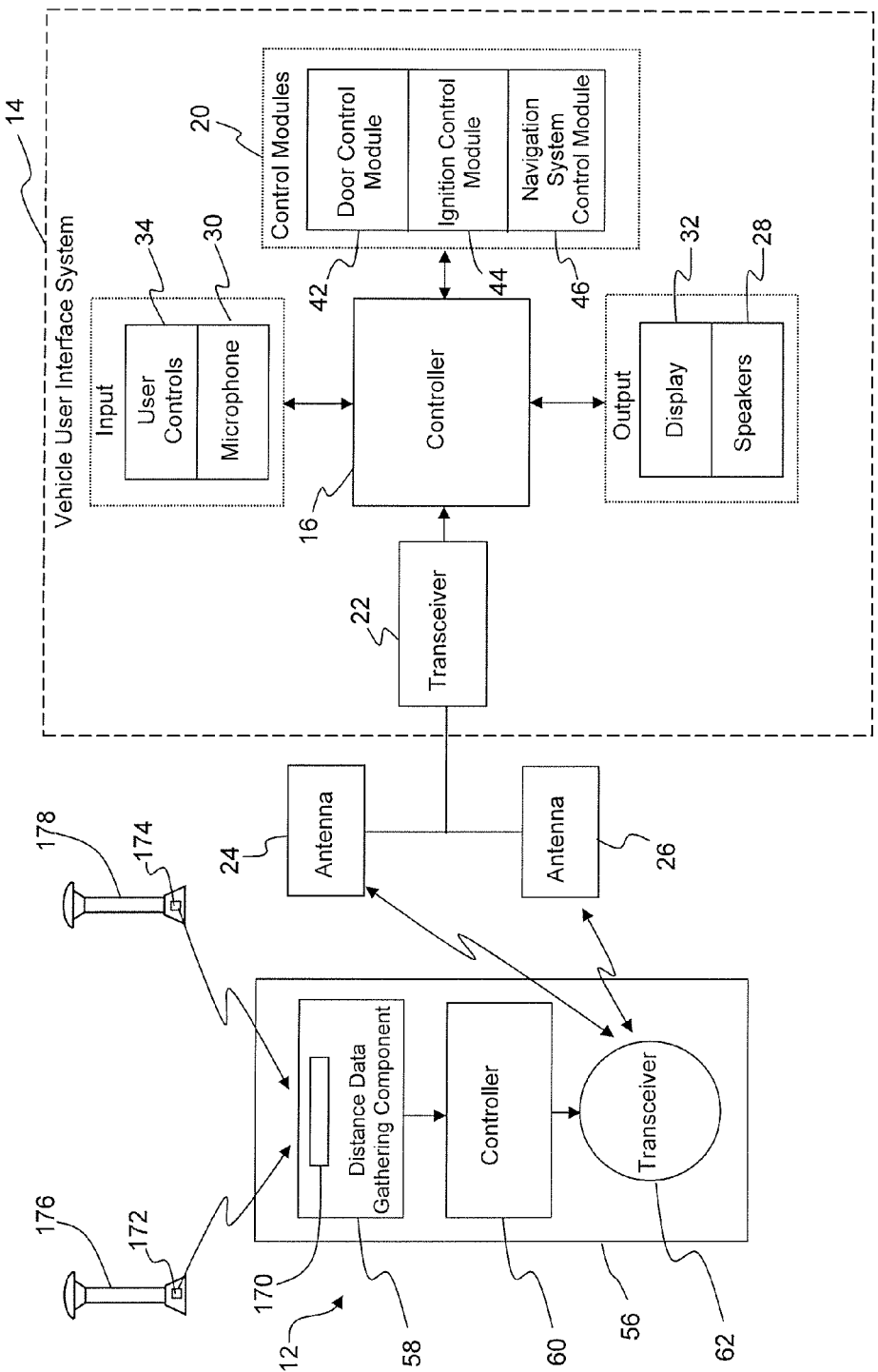
FIG. 17 is a block diagram illustrating exemplary components of an electronic key that includes a receiver that receives location information.

Alternatively or in addition, the distance data gathering component 58, as shown in FIG. 17, can include a wireless receiver 170, such as a radio frequency identification (RFID) receiver or Bluetooth receiver or transceiver. As with the configurations discussed above, the wireless receiver 170 can be attached to the back of the internal circuit board 56 where more packaging space exists within the electronic key 12 to avoid interference with the buttons on the electronic key 12.

Figure 18:
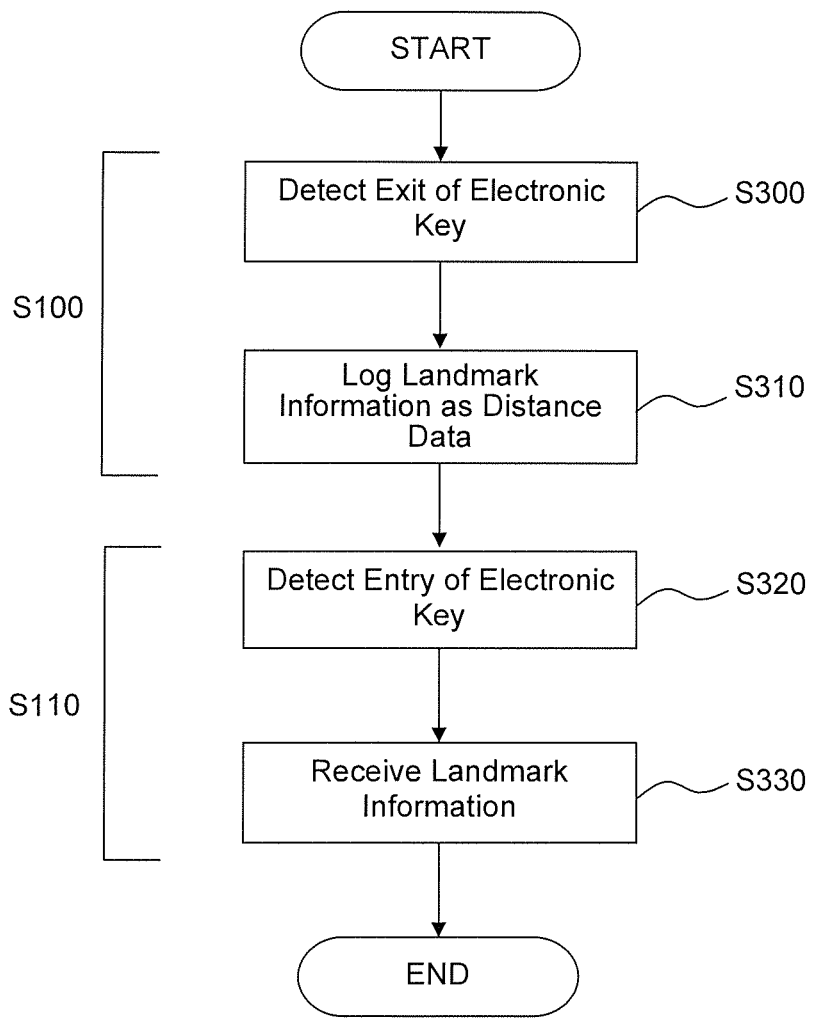
FIG. 18 is a flowchart illustrating exemplary detailed operations performed during the distance data gathering and communication operations of the flowchart shown in FIG. 7 in accordance with the arrangement shown in FIG. 17.
Figure 19:
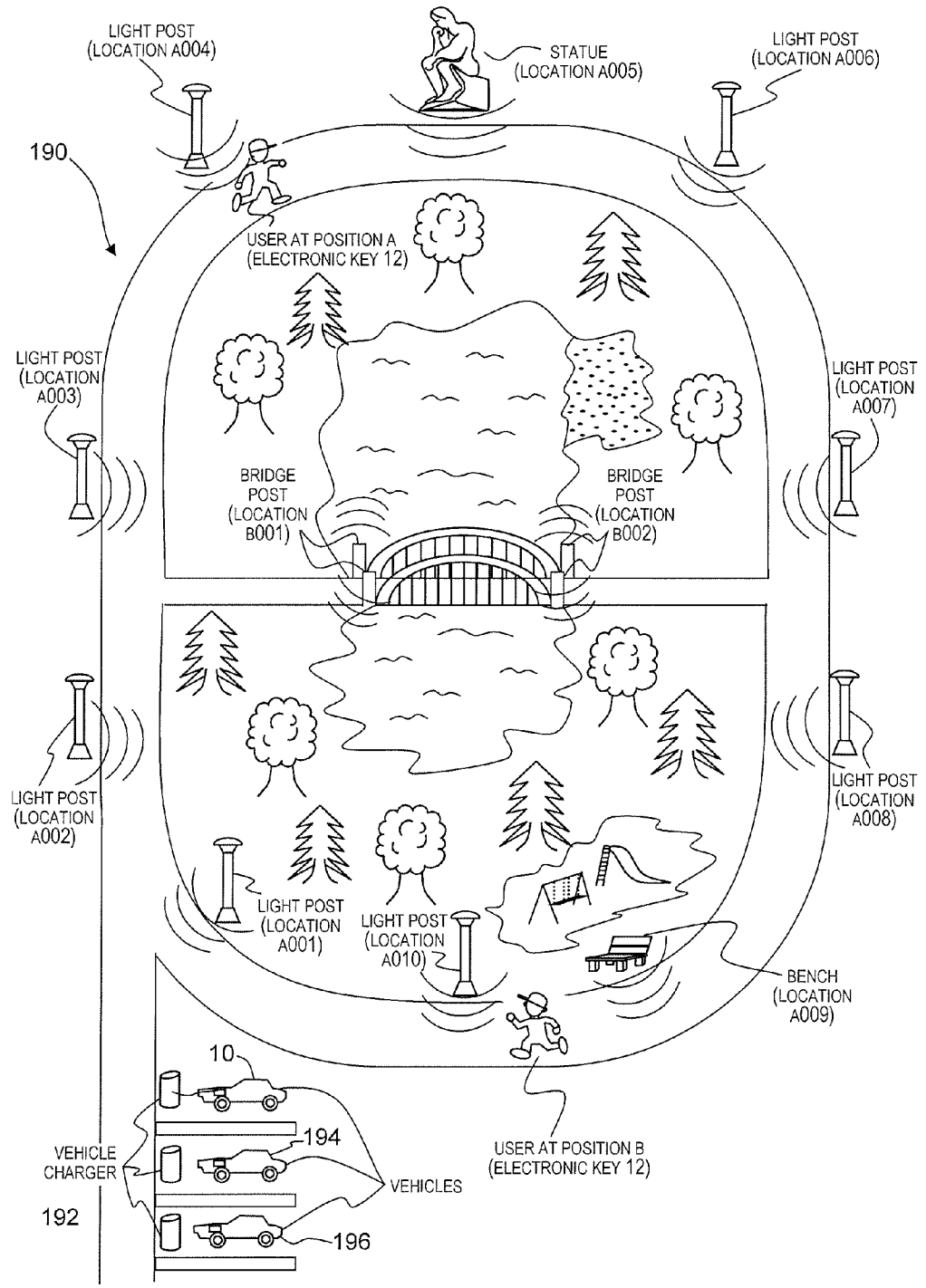
FIG. 19 is a diagram illustrating an example of a path that can be travelled by a user possessing the electronic key.

The wireless receiver 170 can be configured to wirelessly receive location data from transmitter tags 172 and 174, such as RFID transmitter tags, that can be installed, for example, on light poles 176 and 178, in sidewalks, on benches, on fence posts, and at any other suitable location or landmark as shown in FIGS. 16 and 18, and discussed in more detail below. Naturally, the wireless receiver 170 and transmitter tags 172 and 174 need not be RFID transmitters and receivers, but can transmit any suitable type of transmission signals in any suitable format, such as Bluetooth, CMDA, TDMA, QDMA, FDMA, peer-to-peer transmission and so on. The location data transmitted by each respective transmitter tag 172, 174 and so on can include identification data that identifies the transmitter tag (e.g., by number or any other suitable character), the type of landmark (e.g., pole, bench, statue, etc.) to which the transmitter tag is affixed, the park (e.g., park name) in which the transmitter tag is present, and geographical location information (e.g., longitude and latitude coordinates) of the transmitter tag, as well as any other suitable information. The location data received from the transmitter tags 172 and 174 can thus be used to determine the distance travelled by the electronic key 12 and discussed below. Specifically, the controller 60 and/or the controller 16 can store information pertaining to the respective locations of the transmitter tags 172, 174 and so on, or can retrieve that information via, for example, a GPS system as understood in the art. The wireless receiver 170 can also be configured as a global positioning system (GPS) device as understood in the art. Moreover, any suitable number of transmitter tags can be deployed in a given area.

As with the configurations of the data distance gathering components 58 discussed above, the user can enter the user profile information, including the stride length, to calibrate the data distance gathering component. It should be noted that as discussed in more detail below, the wireless receiver 170 configuration monitors the actual location data received from the transmitter tags 172, 174 and so on to determine the distance travelled instead of estimating the distance travelled by counting steps. Hence, the wireless receiver 170 configuration does not necessarily require that a calibration process be performed. Nevertheless if a calibration process is to be performed, the personal profile display 92 can instruct the user to walk for a predetermined distance, such as around the vehicle 10 or along a predetermined path, so that the controller 16 can determine the user's stride length. In this configuration, the controller 16 can perform any of the location determining techniques discussed above to determine the location of the user with respect to the vehicle 10 when the electronic key 12 is within a prescribed distance from the vehicle 10, such as when the user is walking around the vehicle 10. Also, if the user is walking along the prescribed path, the wireless receiver 170 can receive signals from the various transmitter tags 172, 174 and so on and provide that information to the controller 60 which can perform a triangulation process or any other suitable ranging process as known in the art to monitor the location of the electronic key 12 as the user walks for the predetermined distance. Accordingly, the controller 60 can, for example, estimate the user's stride length based on the distance travelled and the time necessary to travel that distance at an average walking pace and provide that estimated stride length information to the controller 16 via transceivers 62 and 22. Alternatively, the controller 60 can provide the information received from the transmitter tags 172, 174 and so on to controller 16 via transceivers 62 and 22, so that the controller 16 can perform the ranging process to estimate the user's stride length. Likewise, the process can be repeated for running and jogging in a similar manner based on the distance travelled at average running and jogging speeds. Furthermore, if the electronic key 12 includes both a pedometer 64 and the wireless receiver 170, the techniques discussed above with regard to the pedometer configurations can be used for calibration purposes.

The distance data gathering component 58 having the configuration shown in FIG. 17 performs the steps shown in FIG. 7 as discussed above for determining distance information using the electronic key 12. That is, in step S100, distance data is gathered based on the distance travelled by the electronic key 12. A subroutine of steps performed in step S100 are shown in FIG. 18. That is, the controller 16 determines in step S300 whether the electronic key 12 exits or is about to exit the vehicle 10. This determination can be made in a similar manner to that discussed above with regard to step S200 in the flowchart of FIG. 8. Then, in step S310, the wireless receiver 170 of the distance data gathering component 58 receives the location data as discussed above from the transmitter tags 172, 174 and so on as the user comes within a certain proximity of the transmitter tags while the user is walking, running or jogging with the electronic key 12. The controller 60 receives the location data from the distance data gathering component 58 and stores the location data.

In step S110 of the flowchart of FIG. 7, the distance data is communicated to the vehicle user interface system 14. That is, as shown in the subroutine steps in FIG. 18, the controller 16 determines in step S320 that the electronic key 12 has entered the vehicle 10 in a manner as discussed above. The transceiver 22, for example, can receive from the transceiver 62 a signal including the stored location data via, for example, antennas 24 or 26, or by an antenna or sensor in or proximate to the charging dock 41 as discussed above. The transceiver 22 thus provides the location data to the controller 16, and the controller 16 stores the location data in memory in step S330.

Accordingly, in step S120 of FIG. 7, the controller 16 calculates the distance data representing the distance travelled by the user based on the location data. For example, since the location of each transmitter tag that the user passed is represented by respective location data, the controller 16 can calculate the sum of the distances between the transmitter tags to determine a total distance travelled. Any known techniques can be used to determine the total distance travelled based on the location data. Then, in step S130, the controller 16 can control the display 32, for example, to present the distance information to the user as discussed above with regard to FIGS. 7 and 9-14. The distance information can also include, for example, the time it took for the user to travel from landmark to landmark and thus, the user's speed between landmarks and average speed can be calculated. The time can be determined by a clock included within the electronic key 12, the location data including a time stamp indicating the time at which the user passed the landmark, or the controller 16 logging at what time the distance measuring process is initialized and finalized. In addition, the controller 16 can control the display 32 to display the location information pertaining to the transmitter tags and their associated landmarks from the location data received from the transmitter tags automatically or upon request of the user via the user controls 34. For instance, the display 32 can display a map with the location information pertaining to the transmitter tags and landmarks to, for example, enable a user to retrace their path. Thus, as can be appreciated from the above, the system used with the electronic key 12 employing the wireless receiver 170 can generally be more accurate than the pedometer systems because the controller 16 determines the distance travelled based on position data instead of estimating the distance travelled based on steps taken.

FIG. 18 and Tables 1 through 5 below demonstrate an example of the location data gathered when a user possessing the electronic key 12 is stepping along a designated path 190. As indicated, the path 190 can be proximate to a vehicle charging station 192 where vehicle 10 and other vehicles 194 and 196 can be parked to charge their batteries. A respective transmitter tag can be disposed at each of the locations A001 through A010, B001 and B002.

For example, as shown in Table 1, the user travels from the vehicle 10 to Position A by passing the locations A001, A002, A003 and A004 in that order as indicated. Hence, the memory associated with controller 60 in the electronic key 12 stores the following exemplary information.

TABLE 1

User at Position A (forward path)

| Landmark Order | Landmark ID# | Park # | Location # | Landmark Description |
|---|---|---|---|---|
| 1 | 003912A001 | 3912 | A001 | Light Post at Entrance |
| 2 | 003912A002 | 3912 | A002 | Light Post |
| 3 | 003912A003 | 3912 | A003 | Light Post |
| 4 | 003912A004 | 3912 | A004 | Light Post |

Accordingly, because the distances between the landmark IDs are known, the controller 16 can determine the distance travelled by the electronic key 12 based on the Landmark ID information. Also, if the distance data gathering component 58 includes a pedometer of the type discussed above that counts steps as discussed above instead of the wireless receiver 170 or in addition to the wireless receiver 170, the controller 16 of the vehicle user interface system 14 can receive and store the following initial and final pedometer values depending on whether or not the pedometer is resettable. The controller 16 can thus use that information to determine the number of steps travelled, the distance travelled and so on, as discussed above.

Pedometer without reset (with initial value=174172): final value=175096

Pedometer with reset (initial value=000000): final value=000924

In the example shown in Table 2, the user travels from the vehicle 10 to Position A by passing the locations A001, A010, A009, A008, A007, A006, A005 and A004 in that order as indicated. Hence, the memory associated with controller 60 in the electronic key 12 stores the following exemplary information and the following pedometer information (if the distance data gathering component 58 includes a pedometer).

TABLE 2

User at Position A (reverse path)

| Landmark Order | Landmark ID# | Park # | Location # | Landmark Description |
|---|---|---|---|---|
| 1 | 003912A001 | 3912 | A001 | Light Post at Entrance |
| 2 | 003912A010 | 3912 | A010 | Light Post |
| 3 | 003912A009 | 3912 | A009 | Bench |
| 4 | 003912A008 | 3912 | A008 | Light Post |
| 5 | 003912A007 | 3912 | A007 | Light Post |
| 6 | 003912A006 | 3912 | A006 | Light Post |
| 7 | 003912A005 | 3912 | A005 | Statue |
| 8 | 003912A004 | 3912 | A004 | Light Post |

Pedometer without reset (with initial value = 174172): final value = 176204
Pedometer with reset (initial value = 000000): final value = 002032

In the example shown in Table 3, the user travels from the vehicle 10 to Position A by passing the locations A001, A010, A009, A008, B002, B001, A003 and A004 in that order as indicated. Hence, the memory associated with controller 60 in the electronic key 12 stores the following exemplary information and the following pedometer information (if the distance data gathering component 58 includes a pedometer).

TABLE 3

User at Position A (zig-zag path)

| Landmark Order | Landmark ID# | Park # | Location # | Landmark Description |
|---|---|---|---|---|
| 1 | 003912A001 | 3912 | A001 | Light Post at Entrance |
| 2 | 003912A010 | 3912 | A010 | Light Post |
| 3 | 003912A009 | 3912 | A009 | Bench |
| 4 | 003912A008 | 3912 | A008 | Light Post |
| 5 | 003912B002 | 3912 | B002 | Bridge Post |
| 6 | 003912B001 | 3912 | B001 | Bridge Post |
| 7 | 003912A003 | 3912 | A003 | Light Post |
| 8 | 003912A004 | 3912 | A004 | Light Post |

Pedometer without reset (with initial value = 174172): final value = 176520
Pedometer with reset (initial value = 000000): final value = 002348

In the example shown in Table 4, the user travels from the vehicle 10 to Position A by passing the locations A001, A002, A003, A004, A005, A006, A007, A008 and A009 in that order as indicated. Hence, the memory associated with controller 60 in the electronic key 12 stores the following exemplary information and the following pedometer information (if the distance data gathering component 58 includes a pedometer).

TABLE 4

User at Position B (full course)

| Landmark Order | Landmark ID# | Park # | Location # | Landmark Description |
|---|---|---|---|---|
| 1 | 003912A001 | 3912 | A001 | Light Post at Entrance |
| 2 | 003912A002 | 3912 | A002 | Light Post |
| 3 | 003912A003 | 3912 | A003 | Light Post |
| 4 | 003912A004 | 3912 | A004 | Light Post |
| 5 | 003912A005 | 3912 | A005 | Statue |
| 6 | 003912A006 | 3912 | A006 | Light Post |
| 7 | 003912A007 | 3912 | A007 | Light Post |
| 8 | 003912A008 | 3912 | A008 | Light Post |
| 9 | 003912A009 | 3912 | A009 | Bench |

TABLE 4-continued

User at Position B (full course)

| Landmark Order | Landmark ID# | Park # | Location # | Landmark Description |
|---|---|---|---|---|

Pedometer without reset (with initial value = 174172): final value = 176687
Pedometer with reset (initial value = 000000): final value = 002515

In the example shown in Table 5, the user travels from the vehicle 10 to Position A by passing the locations A001, A002, B001, B002, A008 and A009 in that order as indicated. Hence, the memory associated with controller 60 in the electronic key 12 stores the following exemplary information and the following pedometer information (if the distance data gathering component 58 includes a pedometer).

TABLE 5

User at Position B (half course)

| Landmark Order | Landmark ID# | Park # | Location # | Landmark Description |
|---|---|---|---|---|
| 1 | 003912A001 | 3912 | A001 | Light Post at Entrance |
| 2 | 003912A002 | 3912 | A002 | Light Post |
| 3 | 003912B001 | 3912 | B001 | Bridge Post |
| 4 | 003912B002 | 3912 | B002 | Bridge Post |
| 5 | 003912A008 | 3912 | A008 | Light Post |
| 6 | 003912A009 | 3912 | A009 | Bench |

Pedometer without reset (with initial value = 174172): final value = 176079
Pedometer with reset (initial value = 000000): final value = 001907

Accordingly, as can be appreciated from the above, the distance determining system provides an easy and automatic way to enable a user of a vehicle to count their walking and/or running progress. The system thus helps to create a bridge between vehicle mobility and personal health.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A distance measuring system comprising:
   a vehicle including a user interface system; and
   an electronic key including:
      a distance data gathering component configured to determine a distance travelled by the electronic key and create distance data based on the distance travelled; and
      a communication component configured to communicate the distance data to the user interface system which is configured to output distance information based on the distance data.

2. The distance measuring system according to claim 1, wherein
   the user interface system includes
      a display; and
      a controller that is configured to calculate an estimated distance travelled by the electronic key based on the distance data and control the display to display the distance information representing the estimated distance.

3. The distance measuring system according to claim 1, wherein
   the distance data gathering component comprises a pedometer configured to count steps taken by a user carrying the electronic key, and the distance data gathering component determines the distance travelled by the electronic key based on a number of the steps counted.

4. The distance measuring system according to claim 3, wherein
   the distance data represents the number of the steps counted; and
   the user interface system is configured to calculate an estimated distance travelled by the electronic key based on the distance data and output the distance information based on the estimated distance.

5. The distance measuring system according to claim 3, wherein
   the pedometer includes one of an accelerometer and a contact switch that is configured to count the steps.

6. The distance measuring system according to claim 3, wherein
   the pedometer includes a continuous step counter and the user interface system receives an initial count value upon determining the electronic key has exited the vehicle and a final count value upon determining the electronic key has reentered the vehicle; and
   the distance information is determined based on the initial count value and the final count value.

7. The distance measuring system according to claim 6, wherein
   the user interface determines the electronic key has exited and entered the vehicle based on at least one of a detected position of the electronic key, a detected vehicle function, and a detected vehicle operating state.

8. The distance measuring system according to claim 1, wherein
   the distance data gathering component comprises a position detecting component configured to monitor successive locations by which the electronic key travels.

9. The distance measuring system according to claim 8, wherein
   the distance data represents the successive locations; and
   the user interface system is configured to calculate respective estimated distances between each of the successive locations, to estimate a distance travelled by the electronic key based on a sum of the estimated distances and to output the distance information based on the estimated distance travelled.

10. The distance measuring system according to claim 1, wherein
    the electronic key includes user controls configured to generate control data communicated to the user interface system to perform vehicle functions.

11. The distance measuring system according to claim 10, wherein
    the communication component is configured to communicate the control data to the vehicle user interface system; and
    the user interface system is configured to calculate an estimated distance travelled by the electronic key based on the distance data and control a display to display the distance information representing the estimated distance upon the vehicle performing at least one of the functions controlled by the control data.

12. The distance measuring system according to claim 1, wherein
    the user interface system receives the distance data upon determining the electronic key has entered the vehicle; and
    the user interface determines the electronic key has entered the vehicle based on at least one of a detected position of the electronic key, a detected vehicle function, and a detected vehicle operating state.

13. The distance measuring system according to claim 1, wherein
    the user interface system is configured to communicate the distance data to a server external of the vehicle.

14. The distance measuring system according to claim 1, wherein
    the user interface system is configured to receive other vehicle distance data from other vehicles and compare the distance data to the other vehicle distance data.

15. A distance measuring method comprising:
    moving an electronic key a distance;
    creating distance data based on the distance travelled by the electronic key;
    detecting the entry of the electronic key into the vehicle;
    communicating the distance data to a user interface system of the vehicle; and
    operating the user interface system to create distance information based on the distance data and output the distance information.

16. The distance measuring method according to claim 15, wherein
    the operating of the user interface system includes calculating an estimated distance travelled by the electronic key based on the distance data; and displaying the distance information representing the estimated distance.

17. The distance measuring method according to claim 15, wherein the moving of the electronic key includes operating a pedometer configured to count steps taken by a user carrying the electronic key based on which the distance data is created.

18. The distance measuring method according to claim 17, further comprising:

determining the electronic key has exited the vehicle;

communicating an initial count value as the distance data upon determining the electronic key has exited the vehicle;

determining the electronic key has entered the vehicle; and communicating a final count value as the distance data upon determining the electronic key has entered the vehicle.

19. The distance measuring method according to claim 15, wherein the moving of the electronic key includes operating a position detecting component configured to monitor successive locations by which the electronic key travels.

20. The distance measuring method according to claim 19, wherein the distance data represents the successive locations; and the operating of the user interface system includes calculating respective estimated distances between each of the successive locations to estimate a distance travelled by the electronic key based on a sum of the estimated distances; and displaying the distance information representing the estimated distance travelled.

21. The distance measuring method according to claim 15, further comprising operating the user interface system to communicate the distance data to a server external of the vehicle.

* * * * *